Dec. 13, 1966      A. L. CRAMER      3,291,392
ROAD RACE CAR SWITCH TRACK
Filed March 5, 1965
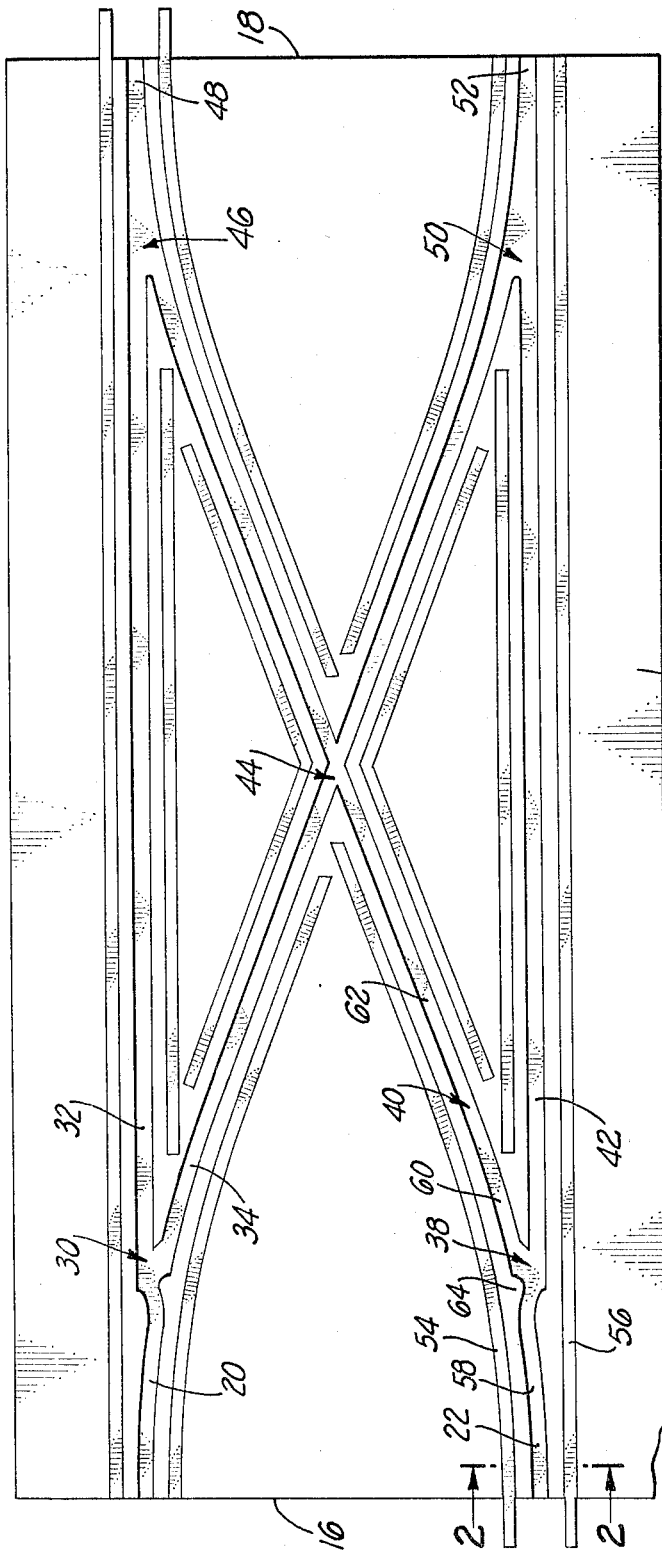
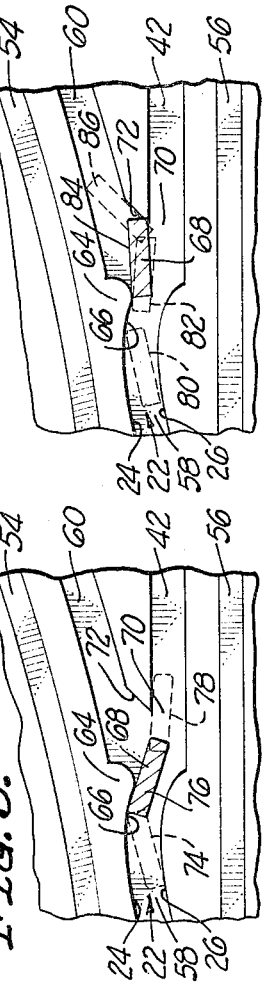
INVENTOR.
ALLEN LEE CRAMER
BY
EDWARD D. O'BRIAN
ATTORNEY & nbsp;

3,291,392
ROAD RACE CAR SWITCH TRACK
Allen Lee Cramer, Garden Grove, Calif., assignor to Eldon Industries, Inc., Hawthorne, Calif., a corporation of California
Filed Mar. 5, 1965, Ser. No. 437,453
6 Claims. (Cl. 238—10)

This invention is directed to a road race car switch track wherein the direction of travel of a road race car thereacross is dependent upon the velocity of the road race car.

Switching structures are well known in games employing vehicles guided by track. Prior switching structures require a movable member which directs the guidance means of the moving vehicle in one or the other of alternative directions so as to direct the vehicle. These prior switches are complex and expensive for they require multiple parts, and several of the parts must be movable with respect to the remainder of the switch track. Of course, the movable element must be controlled, either by manual or power means, and these additional parts add to the expense and the complexity of the switch, and reduce its reliability.

It is an object of this invention to provide a switch track structure particularly suited for the directional control of road race cars, which switch track structure does not employ moving parts for the direction of a vehicle thereacross.

It is another object of this invention to provide a speed sensitive switch track structure particularly adapted for the directional control of road race cars, which switch track structure has no moving parts and which causes a vehicle passing thereacross to selectively follow one direction or another upon the switch track structure depending upon the speed of the vehicle thereacross.

It is a further object of this invention to provide a road race car switch track structure which is of economic and foolproof construction and which accurately directs the path of travel of a road race car passing thereacross depending upon its speed of travel so that the road race car follows a generally straight path at relatively slow speed and follows a relatively curved path at higher speeds.

It is another object of this invention to provide a road race car switch track structure which is compatible with available road race car track and available road race cars so that it may be readily inserted in existing road race car track systems to permit switching therein.

Other objects and advantages of this invention will become apparent from a study of the following portion of this specification, the claims and the attached drawings in which:

FIG. 1 is a top plan view of a switch track structure in accordance with this invention;

FIG. 2 is an enlarged section taken generally along the line 2—2 of FIG. 1;

FIG. 3 is an enlarged partial top plan view showing the path of travel of a road race car thereacross at a relatively slow speed; and FIG. 4 is an enlarged partial top plan view similar to FIG. 3, showing the path of travel of a road race car thereacross at a relatively high speed.

As an aid to understanding this invention it can be stated in essentially summary form that it is directed to a road race car switch track. Road race cars are characterized by support and propulsion wheels rotatably mounted on the chassis and arranged for engagement with a relatively flat top surface of the road race car track. For guidance of such cars, the track is provided with a guide slot and each car is provided with a downwardly projecting guide shoe which engages in the guide slot. Electrical conductors are positioned in the road race track so that they are related to the guide slot. Thus, electrical brushes upon the car related to the guide shoe are kept in engagement with the respective electrical conductors. Switching is accomplished in the instant structure by the particular shaping of the side walls of the guide slot. The single entering slot of the road race car switch track structure diverges into first and second slots between which selective switching is desired. The entry slot is directed toward the first exit track, and a small projection on the side wall of the slot adjacent the juncture is arranged to direct the guide shoe on the road race car toward the second exit track. This structure functionally operates in dependence upon the speed and inertia characteristics of the car and the guide shoe. At high speeds the projection does not act sufficiently upon the guide shoe to direct it into the second exit track. Therefore, a high speeds the car is relatively uninfluenced by the projection and proceeds along the first exit track. At slow speeds, however, the shoe is deflected to a sufficient extent, and the car is directed toward the second exit track and proceeds along the second exit track. Thus, without any moving parts in the switch track structure, selective switching is accomplished by means of speed control of the road race car.

This invention will be understood in greater detail by reference to the following portion of this specification, wherein the drawings are described. Referring now to FIG. 1, a road race car switch track structure is generally indicated therein by the numeral 10. The road race car track switch structure 10 is of compatible design to be directly useable with other track structures so that it may be placed in a track system.

Switch track structure 10 has top surface 12 which is substantially planar and arranged to be the same height as the adjacent track sections. As is seen in FIG. 2, the switch track structure 10 has a bottom surface 14 which establishes this height. Furthermore, switch track structure 10 has first and second ends 16 and 18 which define the longitudinal limits of the track and are arranged to abut the adjacent track sections. First and second entrance slots 20 and 22 are formed to extend below top surface 12, as is indicated in FIG. 2, and each of these slots has left wall 24, right wall 26 and bottom 28. These directions are indicated in accordance with the orientation of a road race car entering the switch track structure 10 from the first end 16 thereof and proceeding toward the second end 18. Entrance slot 20 forms a juncture at 30 with exit slots 32 and 34. Similarly, entrance slot 22 forms a juncture at 38 with first and second exit slots 40 and 42.

As is indicated in FIG. 1, exit slots 34 and 40 cross each other in crossing 44 and join with the opposite exit slots, so that exit slot 40 joins with exit slot 32 at juncture 46 to become slot 48 which is arranged to align with the appropriate slot in the next section. Similarly, exit slot 34 joins with exit slot 42 at juncture 50 to become slot 52 which is arranged to align with the comparable slot in the next track section. It is clear from this structure that a car arriving from the left end of switch track section 10 and being guided by slot 20 can exit either at slot 48 or 52 depending upon the switching occurring at junction 30. Similarly, a car entering and being guided by slot 22 can leave the switch track section 10 by being guided by either slots 48 or 52, depending upon the switching at the juncture 38.

In order to provide power supply to the road race car traveling on the surface of switch track section 10 and being guided by the above described slots, electric conductors are embedded in the switch track section 10, preferably so as to be substantially flush with the surface thereof. Two of such electric conductors are shown at 54 and 56. It is noted that there are appropriate conductors positioned at the top surface 12 in association with the remaining slots in switch track structure 10. These various conductors are electrically connected together so as to receive power from one or more power supplies for the energization of the road race cars arranged to travel across the switch track structure 10.

Thus, the switching occurring at junctions 30 and 38 controls the direction of progress of the road race car. The junctures 30 and 38, and for that matter the entire switch track section 10, is symetrically about its longitudinal center line. Accordingly, only the juncture 38 will be described below. It is understood that juncture 30 is of the same construction and function.

Referring now in more detail to the juncture 38, it is seen that slot 22 is curved inwardly so as to be a circular arc about a center point. This arc is tangent to the leftward extension of slot 42 and is tangent to the straight line, center portion of slot 40. Thus, arcuate portion 58 of slot 22 is tangent at its left end to the extension of slot 42, and arcuate portion 60 of slot 40 is a continuation of the arcuate portion 58 and is tangent to the straight portion 62 of slot 40. Thus, except for the juncture 38, a road race car entering slot 22 would proceed along a smooth curve to the straight portion 62 of slot 40. Projection 64 projects outwardly from the otherwise smooth cylindrical curve of left wall 24. Projection 64 provides a cylindrically curved surface 66 tangent to wall 24 which has a tendency to direct the guide shoe 68 of a road race car away from the smooth arcuate curve defined by arcuate portions 58 and 60. Curved surface 66 is directed toward opening 70 to exit slot 42. The walls between exit slot 42 and arcuate portion 60 are of generally slot width, except for the fact that beveled face 72 is provided and directed toward the arcuate portion 60.

Referring now more particularly to FIG. 3, the interaction between the shoe 68 of the road race car and the junction 38 at relatively slow speeds is described. As the road race car enters slot 22 at a relatively slow speed, it is noted that the arcuate portion 58 when combined with a tendency of the car to travel in a straight line, causes the shoe 58 to primarily engage the right wall 26. Thus, the road race car moves along a leftward curve until the shoe 58 occupies position 74. At this point the front edge of shoe 68 engages the curved surface 66 and the shoe 68 interacts with the car to direct the front end of the car in the direction caused by curved surface 66. Thus, the shoe proceeds to the second position 76 wherein the shoe 68, and the front end of the car, are directed toward opening 70. Engagement of the shoe with the curved surface 66 causes redirecting of the front end of the car toward the entrance 70, because the rate of progress is relatively slow and thus the inertia of the car is relatively low. Engagement with the curved surface 66 is able to properly redirect the path of motion to entrance 70. Thus, the car proceeds along second exit slot 42 when its entrance speed through entrance slot 22 is relatively low. Shoe 68 thus reaches third position 78.

Referring now to FIG. 4, the function of the junction 38 is illustrated for a relatively high speed of the road race car relative to the switch track structure 10. Again, as the car enters entrance slot 22 the curvature of arcuate portion 58 causes shoe 68 to engage on right wall 26 and move the car in a slight leftward curve. In this case, however, due to the higher velocity of the car, the shoe 68 has a greater tendency to bounce from side to side in the guide slot 22. Due to the arcuate portion 58, the car is generally directed along the arc. Thus, shoe 68 moves to a first position 80 which is generally identical to the first position 74 occupied at a lower speed. As the shoe 68 engages curved surface 66 of projection 64 it partially redirects the direction of progress of the road race car and shoe 68.

However, due to the higher speed of the car and its consequent higher inertia, the engagement with curved surface 66 is such that it has less effect in deflecting the car direction. Thus, the shoe 68 moves to second position 82 wherein the rear edge of shoe 68 is engaged with projection 64, but the car is not as greatly redirected by surface 66. At this point the relatively high force due to the higher inertia of the car causes rotation of the shoe 66 by engagement of the rear end of the shoe with projection 64 so that it rotates to a third position 84 wherein the front end of the shoe 68 is directed toward the bevel face 72. Since the bevel face 72 is directed toward arcuate portion 60, the bevel face 72 directs shoe 68 toward arcuate portion 60. Thus, the shoe 68 is directed to occupy fourth position 86 as the car progresses. From position 86 it is clear that the shoe 68 is directed along the arcuate portion 60 of slot 40 so that the car at relatively high speed is directed in that direction.

It will be appreciated that a road race car entering entrance slot 20 will be selectively directed into slots 32 or 34 depending upon its velocity. Similarly, to the above described structure, the juncture 30 cooperates with the road race car in such a manner that when the road race car is operating at a slow speed it is directed from slot 20 into slot 32. Similarly, when the road race car is operated at a relatively high speed, it is directed from entrance slot 20 into slot 34. Thus, the switching of cars at both junctures 30 and 38 are controlled by the individual relative velocity thereof with respect to the road race car track structure 10.

Switch track structure 10 is thus able to direct the direction of the road race car along its length in accordance with the entrance of velocity of the car. No moving parts are required other than the motion of the car with its guide shoe relative to the switch track structure 10. This structure, by this means, introduces another matter of skill into the operation of the road race car so that the operator of the car is able to control its direction of motion. Furthermore, the skill required to direct the car from slot 22 to slot 42 at a maximum speed, and from slot 22 to slot 40 at a minimum speed brings another measure of skillful operation into the racing of road race cars. Furthermore, since no moving parts are required, the road race car switch track section 10 is economic to build and is trouble free through its life.

This invention having been described in its preferred embodiment, it is clear that it is subject to numerous modifications and embodiments without the exercise of the inventive faculty, and within the spirit of this invention. Accordingly, the scope of this invention is defined by the scope of the following claims.

I claim:

1. A road race car switch track structure, said road race car switch track structure comprising:
    a switch track section, said switch track section having an entrance slot and first and second exit slots, each of said slots being adapted to be occupied by the guide shoe on a road race car and having first and second side walls arranged for the guidance of the road race car guide shoe, said entrance slot having its walls formed as curved walls, said first exit slot having its walls formed as curves aligned with said walls of said entrance slot, said second exit slot having its walls directed to be tangent to said walls of said entrance slot, said entrance slot and said first and second exit slots intersecting each other at a juncture;
    a projection positioned on said first side wall at said juncture, said projection projecting outwardly from said first side wall to form an interruption of the curved shape of said first said wall between said entrance slot and said first exit slot, said projection being arranged to direct the shoe of a road race car toward said second exit slot.

2. The road race car switch track section of claim 1 wherein said projection defines a curved surface tangent to said curved surface of said first wall, said curved surface of said projection being directed toward said second exit slot.

3. The road race car switch track structure of claim 2 wherein said second wall of said first exit slot and said first wall of said second exit slot join in a beveled face so as to aid the guidance of a road race car guide shoe.

4. The road race car switch track structure of claim 2 wherein said beveled face is arranged to direct a road race car guide shoe toward said first exit slot.

5. A road race car switch track structure, said road race car switch track structure comprising:

a switch track section, said switch track section having a top surface and a bottom surface, first and second ends on said switch track section;

an entrance slot formed in said switch track section to extend below said top surface thereof, first and second exit slots formed in said switch track section to extend below said top surface thereof, said entrance slot and said first and second exit slots joining together at a juncture, each of said slots having a first wall and a second wall;

said first wall of said entrance slot and said first wall of said first exit slot lying on the arc of a circle having a center point, said second wall of said entrance slot and said second wall of said first exit slot lying upon a second arc of a circle having the same center point, said first wall of said second exit slot lying in a plane which is substantially tangent to said first wall of said entrance slot and said second wall of said second slot lying in a plane which is substantially tangent to said second wall of said entrance slot;

a projection formed at said juncture, said projection from said first wall of said entrance slot and said first exit slot to extend beyond the arc defined by said first wall of said entrance slot and said first exit slot, said projection having a cylindrically curved surface tangent with said first wall of said entrance slot, said curved surface being directed toward said first wall of said second entrance slot;

said switch track structure being so arranged that when the guide shoe of a road race car passes along said entrance slot at a relatively high velocity it is directed toward said first exit slot and when the guide shoe of a road race car passes along said entrance slot at a relatively slow velocity, said projection directs the guide shoe toward said second entrance slot.

6. The road race car switch track structure of claim 5 wherein said road race car switch track structure has a center line substantially parallel to said second exit slot, and said road race car switch track structure is substantially symmetrical about its center line.

References Cited by the Examiner
UNITED STATES PATENTS

| | | | |
|---|---|---|---|
| 2,664,831 | 1/1964 | Fields | 104—247 |
| 3,205,833 | 9/1965 | Fitzpatrick | 246—417 |

ARTHUR L. LA POINT, *Primary Examiner.*

R. BERTSCH, *Assistant Examiner.*

UNITED STATES PATENT OFFICE
CERTIFICATE OF CORRECTION

Patent No 3,291,392 December 13, 1966

Allen Lee Cramer

It is hereby certified that error appears in the above numbered patent requiring correction and that the said Letters Patent should read as corrected below.

Column 2, line 18, for "a" read -- at --; column 3, line 12, for "symetrically" read -- symetrical --; column 6, line 3, after "projection", second occurrence, insert -- projecting --.

Signed and sealed this 26th day of September 1967.

(SEAL)
Attest:

ERNEST W. SWIDER　　　　　　　　　　　　　　　　EDWARD J. BRENNER
Attesting Officer　　　　　　　　　　　　　　　　Commissioner of Patents